3,250,603
METHOD OF TREATING A PREFORMED GLASSY OBJECT
Charles W. Schott, 4769 Barone Drive, Pittsburgh 27, Pa.
No Drawing. Filed Mar. 14, 1961, Ser. No. 95,514
10 Claims. (Cl. 65—21)

This invention relates to coated refractory compositions, and methods of making the same and particularly to articles of glass, slag and like refractory materials coated with materials of higher melting point.

It is well known that glassy refractory materials become plastic and flow at some elevated temperature at which point they generally lose their original shape and if small enough tend to go to a spherical shape.

I have discovered that such objects, if coated by a higher melting point refractory material in very finely divided form (less than about 200 mesh), may be heated to temperatures considerably above (about 600° to 800° F.) their temperature of plastic flow without deformation. I have found that by using this technique I am able to temper such articles to extreme strengths by quenching from temperatures above their temperature of plastic flow while so coated with little or no deformation. The coating material appears to be adsorbed onto the surface of the treated article and to a limited extent, depending upon time and temperature into the surface layer to form a "shell" or "mold" of the original shape and to retain that shape even through the interior is of a temperature above the temperature of plastic flow.

I have found that finely divided carbonaceous material such as graphite and carbon, aluminum oxide, calcium oxide, calcium carbonate, magnesium oxide, magnesium carbonate, iron oxides (both red and black), silicon carbide, silicon dioxide, ground silica sand, finely ground copper, nickel, chromium, iron and steel and mixtures of such materials as well as various finely ground rocks and clays having melting points above the plasticity temperature of the body being treated may be used.

The practical use of my invention as well as the practice of the invention can perhaps be best understood by the following examples:

Example I

A pair of eyeglass lenses were heated to a temperature of 2200° F., one being coated with −300 mesh aluminum oxide, and the other without any coating. The uncoated lens began to lose its shape at about 1700° F. and flowed completely out of shape at 2200° F. The coated lens was raised to 2200° F. without loss of shape and was quenched in oil to room temperature resulting in a lens of great strength and no significant loss of shape. It can be seen that this technique can be advantageously used for a variety of heat treatments on previously formed articles.

This same technique has been used with coatings of −300 mesh graphite, carbon, various metals and other refractory materials.

I have found that similar results can be achieved by packing the object to be heated in a mass of such fine refractory materials.

Example II

Soft glass discs were packed and heated in (1) +100 mesh graphite and (2) −300 mesh graphite to a temperature of 2200° F. The disc heated in +100 mesh graphite assumed a generally spherical shape whereas the disc in −300 mesh graphite retained its shape without substantial change.

I have also found that this invention can be applied in the forming of glass and like objects to prevent loss of shape after forming and during annealing. For example, I have drawn threads of soft glass to which I added a coating of $Al_2O_3$ to the thread while still soft by dusting the $Al_2O_3$ onto the surface. The surface was immediately fixed and further drawing did not cause further elongation or reduction of diameter. A like thread drawn from the same pool continues to be reduced and elongated beyond the point at which the first thread was treated and ceased to elongate.

Objects molded in molds which had a surface coating of $Al_2O_3$ had a thin coating adhering thereto and the edges were sharp and clear. Such objects, when removed from the molds retained their shape, could be removed quicker and annealed without loss of contour or shape.

I have found that if the temperature of a refractory oxide coated glass particle of my invention is raised above the softening point of the glass interior and held a sufficient time to cause the coating to be partially dissolved in the glass, an outer coating is formed which upon cooling resists deformation and gives greater uniformity and strength.

As an example, a soft glass particle was coated with $Al_2O_3$ heated to 2500° F. and held there until the particle spheroidiized. The sphere was quenched in oil. There was no noticeable deformation, no cracking or spalling and the sphere, which was about ⅜ inch in diameter had a compressive strength of 180,000 lbs. per square inch.

This same test was repeated with a coating of $Fe_2O_3$ with like results and a compressive strength of 178,000 lbs./in.

I have also discovered that if such coated objects are heated to the point where the glass interior is above its last equilibrium point, the mass assumes a cellular spherical form. This is apparently caused by entrained gases in the glass expanding but being held within the outer sheath of refractory material. The size and distribution of the bubbles appears to be a function of the temperature. The higher the temperature, the larger the bubbles.

Example III

Small irregular pieces of soda glass (about ¼″) coated with aluminum oxide were heated to 2500° F. (their previous equilibrium point was the original melting temperature of about 2400° F.) at which time they began to show signs of spheroidizing, at 2800° F. small internal bubbles appeared, at 3000° F. the bubbles appeared to coalesce into fewer larger bubbles and at 3100° F. there appeared to be a single large bubble in the center forming a hollow glass sphere coated with a film of aluminum oxide over a mixture of the glass and $Al_2O_3$. The aluminum oxide shell appeared to hold the gases in the glass and restrict their expansion and escape.

Rapid cooling as by quenching sets this outer shell and retains the cellular form.

I have used the coating and heating technique described in Example I to temper and harden hollow objects such as dishes, bearing jewels, artificial teeth, notched cylinders and hollow cylinders.

While I have illustrated and described certain preferred embodiments and practice of my invention, it will be understood that this invention may be otherwise embodied within the scope of the following claims.

I claim:

1. The method of treating a preformed glassy object at temperatures above those at which it normally becomes plastic without loss of shape comprising the steps of coating said object with a non-reactive material finer than 200 mesh and having a melting point above the desired temperature of treatment, thereafter subjecting said object to a tempering operation by heating said object to the desired temperature, and then quenching said object.

2. The method of treating a preformed glassy object at temperatures above those at which it normally becomes plastic without loss of shape comprising the steps of coating said object with aluminum oxide finer than 200 mesh, thereafter subjecting said object to a tempering operation by heating said object to the desired temperature, and then quenching said object.

3. The method of treating a preformed glassy object at temperatures above those at which it normally becomes plastic without loss of shape comprising the steps of coating said object with a carbonaceous material finer than 200 mesh, thereafter subjecting said object to a tempering operation by heating said object to the desired temperature, and then quenching said object.

4. The method of treating a preformed glassy object at temperatures above those at which it normally becomes plastic without loss of shape comprising the steps of coating said object with a non-reactive metal powder finer than 200 mesh and having a melting point point above the desired temperature of treatment, thereafter subjecting said object to a tempering operation by heating said object to the desired temperature, and then quenching said object.

5. The method of treating a preformed glassy object at temperatures above those at which it normally becomes plastic without loss of shape comprising the steps of packing said object in a bed of non-reactive material finer than 200 mesh and having a melting point above the desired temperature of treatment, thereafter subjecting said object to a tempering operation by heating said object to the desired temperature, and then quenching said object.

6. The method of treating a preformed glassy object at temperatures above those at which it normally becomes plastic without loss of shape comprising the steps of packing said object in a bed of aluminum oxide finer than 200 mesh, thereafter subjecting said object to a tempering operation by heating said object to the desired temperature, and then quenching said object.

7. The method of treating a preformed glassy object at temperatures above those at which it normally becomes plastic without loss of shape comprising the steps of packing said object in a bed of carbonaceous material finer than 200 mesh, thereafter subjecting said object to a tempering operation by heating said object to the desired temperature, and then quenching said object.

8. The method of forming a cellular glassy object comprising the steps of coating said object with a non-reactive refractory material having a melting point higher than that of the glass and being finer than 200 mesh, and subjecting said object to a tempering operation by heating the coated object to a temperature above the last equilibrium temperature of the glass, and then quenching said object to form a shell of the coating material thereon.

9. The method of forming a cellular glassy object comprising the steps of coating said object with aluminum oxide finer than 200 mesh, subjecting said object to a tempering operation by heating the coated object to about 2900–3100° F., and then quenching said object to form a hard shell of aluminum oxide thereon.

10. The method of forming a spherical glassy object of high hardness comprising the steps of coating a pellet of glassy material with a non-reactive refractory oxide having a melting point more than about 500° F. above the melting point of the glassy material, subjecting said coated pellet to a tempering operation by heating the same above its melting point, holding said pellet until a portion of the coating is taken up by the molten mass to form an intermediate shell beneath the outer coating of oxide, and then quenching said pellet to atmospheric temperature.

References Cited by the Examiner

UNITED STATES PATENTS

| 2,215,227 | 9/1940 | Nash | 65—60 |
| 2,455,719 | 12/1948 | Weyl et al. | 161—124 |
| 2,670,573 | 3/1954 | Sullivan | 65—160 X |
| 2,795,084 | 6/1957 | Littleton | 65—60 |
| 2,995,461 | 8/1961 | Boicey | 117—5.5 |
| 3,058,866 | 10/1962 | Gunther et al. | |

DONALL H. SYLVESTER, *Primary Examiner.*

G. R. MYERS, *Assistant Examiner.*